United States Patent [19]

Ogan

[11] 4,225,233
[45] Sep. 30, 1980

[54] RAPID SCAN SPECTROPHOTOMETER

[75] Inventor: Kenneth L. Ogan, Bethel, Conn.

[73] Assignee: The Trustees of Boston University, Boston, Mass.

[21] Appl. No.: 874,399

[22] Filed: Feb. 2, 1978

[51] Int. Cl.³ .......................... G01J 3/18; G01J 3/42
[52] U.S. Cl. .................................... 356/308; 356/334
[58] Field of Search ................. 356/308, 309, 83, 320, 356/318, 328, 334

[56] References Cited

U.S. PATENT DOCUMENTS 4,070,111   1/1978   Harrick ............................... 356/308

OTHER PUBLICATIONS

Ogan et al., Review of Scientific Instruments, vol. 48, No. 2, Feb. 1977, pp. 142-147.
Bonfiglioli et al., Applied Optics, vol. 3, No. 12, Dec. 1964, pp. 1417-1424.
Bonfiglioli et al., Applied Optics, vol. 6, No. 3, Mar. 1967, pp. 447-455.
Strojeck et al., Analytical Chemistry, vol. 41, No. 3, Mar. 1969, pp. 481-484.

Primary Examiner—F. L. Evans
Attorney, Agent, or Firm—Martin M. Santa

[57] ABSTRACT

A spectrometer capable of providing a predetermined wavelength of output light in accordance with a control voltage signal applied to a scanning element is described. The scanning element located at the grating image of the spectrometer is a small mirror attached to the rotor of a galvanometer whose angular position is accurately controlled by a closed-loop electronic control. The spectrum reflected from the mirror is passed through a slit to provide the output light of a predetermined wavelength. Selection of the waveform of the control signal allows the spectrometer to be operated as a dual wavelength spectrometer, to use a linear wavelength scan, or other wavelength scan patterns for absorbance analyses of a sample. The rapid scan capability of this instrument has been utilized to extend the measurement of absorbance changes at one wavelength, corrected for light scattering changes (dual-wavelength spectroscopy), to the measurement of the complete differential absorbance spectrum, similarly corrected for light scattering changes (corrected-differential spectroscopy).

4 Claims, 3 Drawing Figures

RAPID SCAN SPECTROPHOTOMETER

This invention was made during the course of research supported by grants from the USPHS (HE 13648, AN 17817, and HL 14322) and the U.S. Government has rights in this invention pursuant to an I.P.A. awarded by H.E.W.

BACKGROUND OF THE INVENTION

This invention relates to an improved type of rapid scan spectrophotometer and method of using it in several modes to obtain the absorption characteristics of clear low molecular weight solutions. More particularly, the spectrophotometer of this invention utilizes a technique for accurately controlling the spectrum being observed at a known time and subsequently processing the transmitted spectrum to obtain the absorption characteristic of the material being observed.

Although electronic absorption (uv-visible) spectrophotometry is an attractive investigative tool for clear, low molecular weight solutions, the application of this technique to the study of biological preparations is not straightforward, primarily because these complex and heterogenous systems show broad overlapping absorption bands which scatter light strongly. Where the parameter of interest is not the total absorbance, but the change in absorbance, several prior art spectrometers have been found useful. In the prior art split-beam spectrometer light from a monochromator is alternately passed through two identical samples which are subjected to different conditions. The difference in absorption between the samples is then recorded as a function of wavelength. This approach allows the measurement of small absorbance changes on a large background. However, if the amount of scattered light is time dependent, or if it changes as a consequence of the change in experimental conditions, false absorbance changes will be recorded.

The prior art dual wavelength spectrometer provides a means of correcting for these scattering changes. As the names implies, light of two different wavelengths is used, but both beams pass through the same sample. Variations in light intensity at some reference wavelength at which there is no absorbance change will reflect only scattering effects. To the extent that the relative changes in scattered light are the same at two neighboring wavelengths, the intensity at the reference wavelength provides a continuous correction for scattering occurring at neighboring wavelengths. Also, because the dual wavelength spectrometer rapidly monitors light intensities at a specified pair of wavelengths, it can be used for kinetic studies.

It is therefore a primary object of this invention to provide a rapid-scan spectrophotometer which can operate in a variety of spectroscopic modes, two of which are analogous to those just discussed. The controlled-scan spectrophotometer (CSS) of this invention has been operated as a dual-wavelength spectrophotometer, but one which uses only a single monochromator.

The CSS has also been used to obtain the complete absorbance spectrum, corrected for light scattering changes in the same way that the dual-wavelength approach provides correction at a single wavelength. This latter technique has been called "corrected-differential" spectrophotometry.

Other advantages, features, and objects of the invention will appear from the following description taken together with the drawings in which.

SUMMARY OF THE INVENTION

The difference between the spectrometer of this invention and conventional spectrometers is that here an image of the grating is generated optically, and a scanning element is located at this grating image. Consequently, the wavelength of the light passing through the exit slits can be changed by rotating the scanning mirror rather than the massive grating mount, enabling rapid wavelength changes. The scanning element is a small mirror mounted on the rotor of a galvanometer under closed-loop electronic control, which forces the mirror angular position to follow the input drive signal rapidly and accurately. This type of scan control allows aperiodic and and discontinuous wavelength scans as well as the more customary sinusoidal scans.

With a square wave mirror drive, this instrument can be operated as a dual-wavelength spectrometer, even though it has only one monochromator. This instrument can also be used to generate rapid, linear wavelength scans, by using a periodic ramp mirror drive signal. This last mode of operation generates complete transmission spectra, which are stored in digital memory. These spectra, together with a priori knowledge of the true absorbance at some reference wavelength, enables an absorbance spectrum corrected for light scattering changes to be generated.

DESCRIPTION OF PREFERRED EMBODIMENT

Figure 1:
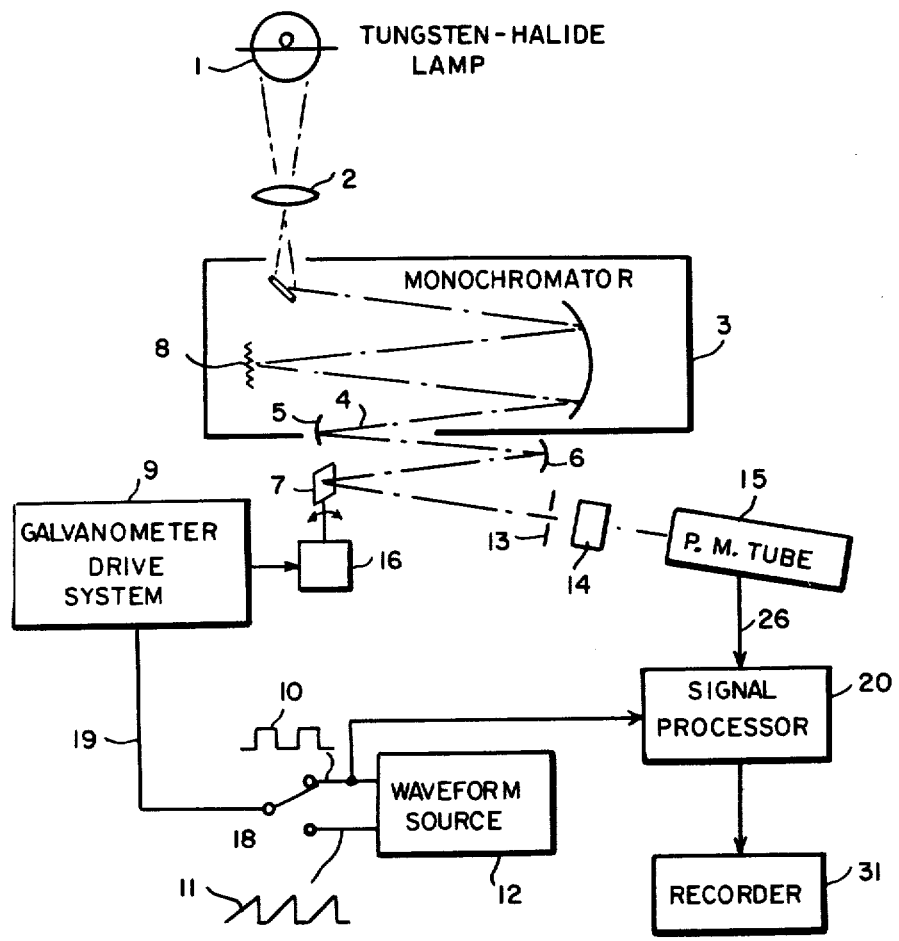
FIG. 1 is a diagrammatic representation of the controlled-scan spectrometer of this invention.

A block diagram of the controlled scan spectrophotometer of this invention is shown in FIG. 1. The light source 1, typically a 250 watt tungsten-halide lamp powered by a DC power supply, is focused by a lens 2 to provide a broad band light source to the modified monochromator 3. A plane mirror 5 intercepts the exiting beam 4 before it reaches the exit slit of the monochromator, directing the beam to a spherical mirror 6 (typically 100 mm diameter with a 100 mm focal length). A small mirror 7 (typically 25 mm by 25 mm) is placed at the image of the grating 8 generated by the spherical mirror 6. The mirror 7 is mounted on a galvanometer 16 and a closed loop galvanometer drive system 9 (for example a drive system such as that General Scanning Corporation, Watertown, MA Model G-306PD) accurately controls the angular position of the mirror 7 in accordance with the voltage output of waveform source 12. Typically, a square wave 10 or a ramp waveform 11 is produced on the input line 19 to the drive system 9 by the waveform source 12 and one may be selected by switch 18. Immediately behind the slit 12, the sample chamber 14 and photomultiplier tube 15 are mounted on an optical rail (not shown) which allows close, reproducible positioning and provides maximum flexibility in the design and use of sample chambers.

Rotation of the galvanometer 16 (and mirror 7) by the galvanometer drive system 9 in response to the voltage from source 12 causes the spacially dispersed image of the grating 8 to move across the exit slit 13. The wavelength of the light passing through the slit 13 is thus determined by the angular orientation of the mirror 7, and hence by the voltage applied to the galvanometer drive system 9 from the waveform source 12. Since the galvanometer postion is directly related to the current flowing through the galvanometer, the current in the galvanometer is sensed and used in a feedback loop in the glavanometer drive system 9, as in conventional closed loop positioning systems causing the mirror 7 orientation to reflect the input voltage from waveform source 12 accurately and rapidly. (The mirror stabilizes in its new position with two milliseconds after impositon of a large voltage step.) The spectrum can be scanned in any desired pattern by electronically synthesizing the appropriate pattern of voltages produced by the waveform source 12. Typical waveforms are the square waveform 10 and the ramp waveform 11. The scan rate of the mirror 7 is limited by the mass of the mirror 7 but presents no problem for the rates used in this invention.

In the methods employed in this invention two mirror waveforms 10 and 11 have been used. For dual-wavelength spectrophotometry, a square wave drive signal 10 of suitable amplitude and voltage levels is used to select light at the two desired wavelengths at the exit slit 13. For the method of corrected-differential spectrophotometry, a periodic ramp 11, which causes the linear scan of the wavelength band, is used. These waveforms may be generated by conventional well-known circuitry. The amplitude of the voltage waveforms determines the scan range. Scan ranges of from 50 to 300 nm have been used. In principle, the scan range can extend to the full range of 600 nm available at the output of the spectrometer grating. However the wider scan range results in reduced wavelength accuracy because of limitation of the galvanometer-drive system. Scan frequencies of 15 and 30 hertz have been used for convenience since they are easily obtained from a 60 cycle power source and are rapid enough that the conditions of the sample being observed does not perceptibly change. Other scan frequencies could easily be provided by conventional circuitry.

DUAL-WAVELENGTH SPECTROPHOTOMETRY

Figure 2:
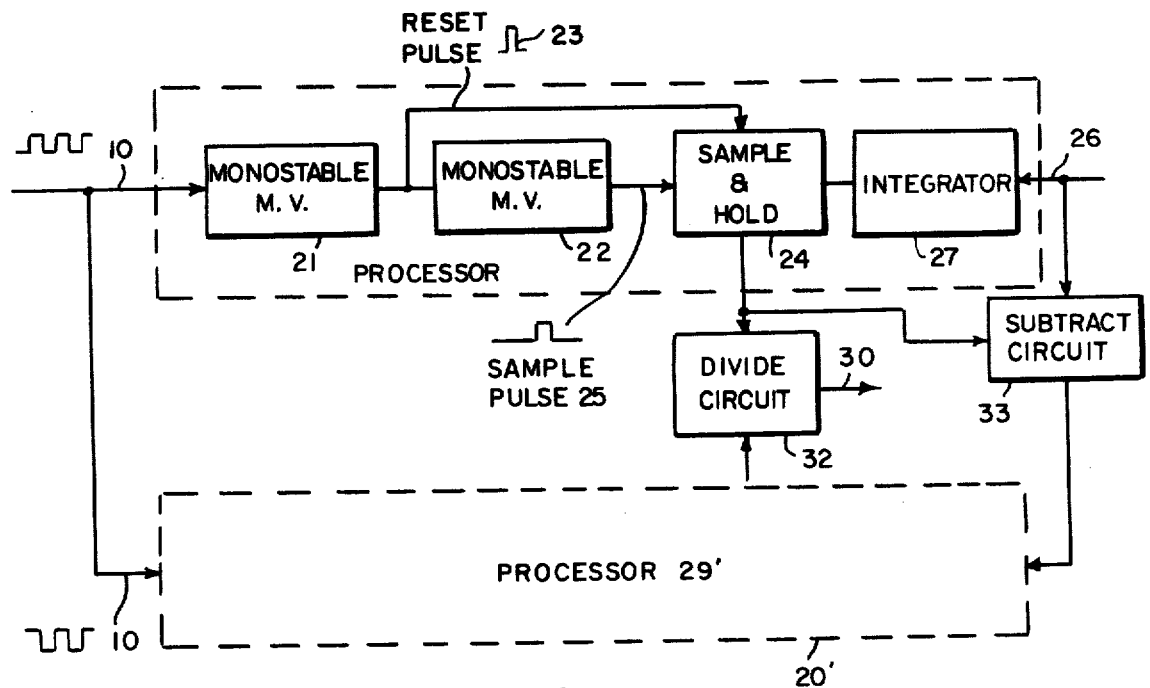
FIG. 2 is a block diagram of the signal processor used for the dual-wavelength mode of operation.

In this mode of operation the waveform source 12 provides a square wave mirror signal 10 on line 19 which also serves as an input to a pair of monostable multivibrators 21, 22 used for timing purposes shown in FIG. 2. The output pulse 23 from the multivibrator 21, which occurs during the interval when the mirror 7 orientation is changing, resets to zero the output from the integrating sample and hold circuit 24. The output pulse 25 from the second multivibrator 22 occurs during the period when the mirror orientation is stable (i.e., light of one wavelength is passing through the slit). The signal 26 from the photomultiplier 15 is integrated in integrator 27 during the time of occurrence of pulse 25. The final value of the integrated signal output 28 of integrator 27 is held by the sample hold circuit 24 until the reset pulse 23 starts the cycle over again. A subtraction circuit 33 subtracts the output of the sample and hold circuit 24 from the photomultiplier tube signal 26. The complement $\bar{8}$ of the square wave 8 is the input to an identical set of timing and sample hold circuits 29' which integrate and then hold the output of this subtract circuit when the photomultiplier tube is responding to light at the second wavelength. The outputs of the circuits 29, 29' are combined in divider 32 to provide the output signal 30 from the processor 20' to the recorder 31 of FIG. 1.

The output signal 30 of the spectrometer is $$S = \kappa(V_m - \alpha V_r)/\alpha V_r,$$

where $V_m$ and $V_r$ are the voltages corresponding to the photomultiplier output for incident light of wavelength $\lambda_m$ (measurement) and $\lambda_r$ (reference), respectively, and $\kappa$ and $\alpha$ are adjustable gains. This format is equivalent to the ratio detection method in conventional dual-wavelength spectrometers. The gain $\alpha$ of circuits 29' is adjusted to set S to zero initially. Then, if $\lambda_r$ is an isobestic point, and if the relative scattering changes are the same at two wavelengths, $\Delta S$, the signal at line 30, is related to the absorbance change at $\lambda_m$, $\Delta A_m$, by $$\Delta S = \kappa(10^{-\Delta A_m} - 1) \approx -\kappa(\ln 10)\Delta A_m,$$

where the approximation is valid for small $\Delta A_m$.

CORRECTED-DIFFERENTIAL SPECTROPHOTOMETRY

Figure 3:
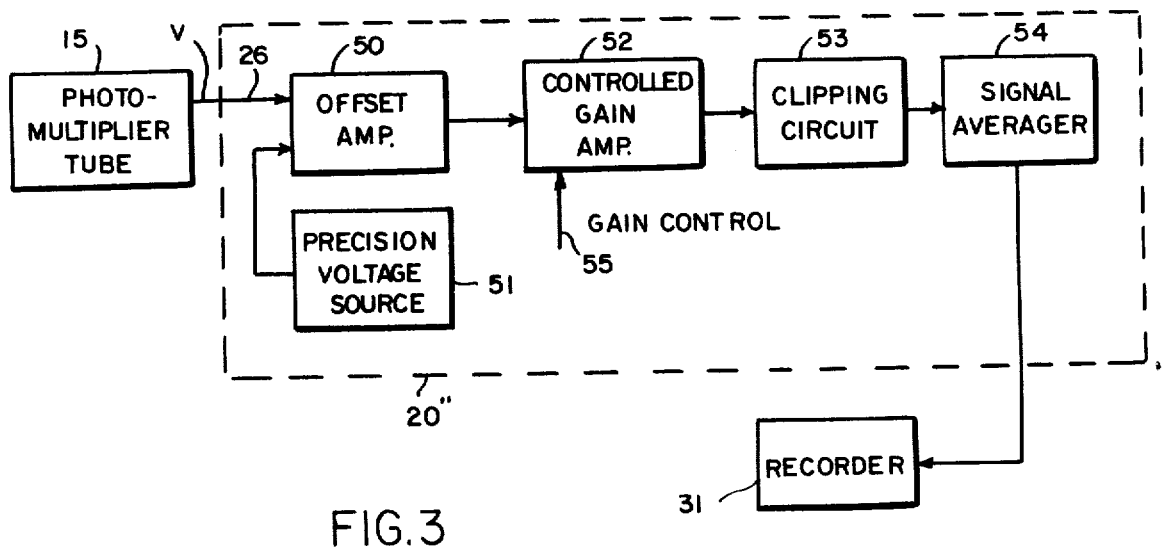
FIG. 3 is a block diagram of the signal processor used for the corrected-differential mode of operation.

The periodic ramp mirror-drive waveform 11 of waveform source 12 results in a linear scan across slot 13 of the dispersed spectrum generated by the monochromator 3 with a selectable range of 50–300 nm. The intensity spectrum transmitted through the sample 14 is converted to an electronic signal by the photomultiplier tube 15 and stored for use in later calculations of absorbance changes. For small absorbance changes, several sweeps must be summed to obtain a suitable signal-to-noise ratio. FIG. 3 details the signal processing which occurs prior to storage of the intensity spectrum. The swept signal output of photomultiplier tube 15 is applied to the first amplifier circuit 50 which provides a voltage offset at its output. ($V_B$ is supplied by a precision voltage source 51, such as Electronic Development Corp., Model MV 100N.) The signal amplification is selected by the setting of gain control 55 of the second amplifier 52. Amplification is followed by clipping circuit 53 which prevents overloading of the signal averager 54 input circuits.

Since the ramp mirror drive signal 11 causes a linear wavelength scan, the signal averager 54 output (after 1 to N sweeps) is the transmitted light intensity as a function of wavelength. The intensity spectrum is recorded at gain = 1, and then again at high gain, G, with an offset voltage from source 51 sufficient to buck out the bulk of the background voltage. The sample 14 is perturbed and the new intensity spectrum is recorded at the same high gain and offset. The apparent absorbance change $\Delta A^*$, is then calculated from $$\Delta A^*(\lambda_n) = -\log\left[1 + \frac{v'(n) - v(n)}{GV(n)}\right]$$

where $V(n)$ and $v(n)$ are voltages at the nth data point in the signal averager 54 and are related to the transmitted light intensity at the wavelength, $\lambda_n$, which corresponds to the nth data point. The voltage $v(n)$ is the result of the application of the bucking voltage and gain G to the voltage V at the output of tube 15, which itself is directly proportional to the light intensity incident on the photomultiplier tube. The voltage $v'(n)$ indicates data taken after perturbation of the sampling conditions.

The contribution of light scattering changes to the apparent absorbance change is evaluated at the reference wavelength $\lambda_r$, $$\Delta T = \Delta A^*(\lambda_r) - \Delta A(\lambda_r),$$

where $\Delta A(\lambda_r)$ is the true absorbance change at $\lambda_r$ (as determined by an independent study). It is assumed that $\Delta T$ is independent of wavelength in the neighborhood of $\lambda_r$, so the true absorbance changes at neighboring wavelengths are given by $$\Delta A(\lambda_n) = \Delta A^*(\lambda_n) - \Delta T.$$

After each intensity spectrum is averaged, the digital contents of the signal averager, typically a Biomac Model 1000, are recorded at each data point and subsequently processed in a conventional calculator or minicomputer to provide $\Delta A^*(\lambda_n)$ and then $\Delta A(\lambda_n)$ in accordance with the equation therefore.

CONCLUSION

The rapid scanning capability and the use of a closed-loop galvanometer system of the controlled-scan spectrophotometer provides a versatile instrument. Nonlinear and discontinuous scanning patterns can be used with greater efficiency than the sinusoidal pattern of a resonant mirror system, and the possibility of nonperiodic patterns permits other applications which would be impossible with a resonant system. Thus, in the dual-wavelength mode, the use of a square-wave pattern rather than a sinusoidal pattern means that much more time per scan is spent at the two wavelengths of interest, permitting longer integration times for reduction of photon noise. Again, the use of a periodic ramp in the corrected-differential mode means that much less time is wasted in bringing the mirror back to start the scan again.

The operation of the instrument as a dual-wavelength spectrometer, and its response to insertion of neutral density filters is a clear demonstration of its ability to correct for changes in light scattering. Insertion of these filters into the beam causes changes equivalent to 0.001 A or less, i.e., the spectrometer corrected >99% of the induced "scatter." The sensitivity is not quite that of commercial units, but this could be improved by using better sample-and-hold amplifiers (with less noise) and a more accurate divide circuit. As it is, the novel design of this invention requires only one monochromator, provides good sensitivity at much lower cost, and offers an important advantage over a conventional unit: additional wavelength pairs could be simultaneously monitored by adding steps of appropriate amplitude to the square-wave mirrordrive waveform and adding data processing circuits identical to those already in use. In comparison, a 4-wavelength spectrometer recently reported by another involved much effort and ingenuity in modifying a standard dual-wavelength spectrometer with considerable loss in time resolution.

The operation of this instrument has been described in a new mode, that of corrected-differential spectroscopy. The wavelength band is linearly scanned, and the transmitted intensity spectrum is stored in a memory unit. If the intensity spectrum is recorded before and after perturbation of the same conditions, the resulting differential absorbance spectrum can be calculated. This apparent absorbance change, $\Delta A^*(\lambda_n)$, includes the real absorbance change $\Delta A(\lambda_n)$, and an artificial change due to changes in light scattering, $\Delta T(\lambda_n)$, $$\Delta A^*(\lambda_n) = A(\lambda_n) + \Delta T(\lambda_n).$$

The variations in light scattering have a broad effect on the transmitted light intensity; in particular, it is assumed that the relative changes in light intensity caused by fluctations in light scattering are essentially identical at neighboring wavelengths. If a similar assumption is made with regard to the scattering changes produced by the perturbation of the sample conditions, then the effects of light scattering enter as an additive constant [$\Delta T$]. (This is an inherent assumption of dual-wavelength spectroscopy.) Thus, if the true absorbance change at some reference wavelength, $\lambda_r$, is known, $\Delta T$ can be evaluated, and the true absorbance changes at neighboring wavelengths determined. (In practice, an isosbestic point is often chosen as the reference wavelength.) Although the precise value of the scattering contribution may vary from scan to scan, measurements at the reference wavelength permit this value to be evaluated for each absorbance calculation. Consequently, repetitive scans of the intensity spectrum can be summed and used in place of a single scan. The corrected-differential spectrum is equivalent to the point spectrum which would be obtained by recording the absorbance changes by dual-wavelength spectroscopy as $\lambda_m$ is successively incremented and the experiment repeated. The corrected-differential technique permits this information to be collected in a single experiment.

It is evident that those skilled in the art, once given the benefit of the foregoing disclosure, may make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and spirit of the appended claims.

What is claimed is:

1. Apparatus for providing a controlled scan spectrophotometer comprising
   a voltage waveform source,
   a grating for providing a spectrally dispersed beam of light,
   means for optically scanning said light spectrum in response to said voltage waveform,
   means for selectively obtaining a predetermined narrow band of said spectrum in response to the voltage of said source, and
   means for detecting the amplitude of the narrow band spectrum,
   wherein said means for optically scanning the broadband spectrum comprises,
   a galvanometer,
   a mirror mounted on said galvanometer and reflecting the light spectrum provided by said grating,
   a focusing element located between said grating and said galvanometer mirror to provide a focused optical image of said grating on said mirror.

2. The apparatus of claim 1 wherein said means for optically scanning the light spectrum further comprises,
   a closed-loop drive system connected to said galvanometer to accurately control the angular position of said galvanometer in response to the voltage of said waveform source, and said means for selectively obtaining a narrow band spectrum comprises a slit in the path of the scanned light spectrum reflected from said mirror, said slit allowing only a narrow portion of the spectrum of said scanned beam to impinge upon said detecting means.

3. The apparatus of claim 2 comprising in addition means for positioning a substance between said slit and said detector.

4. The apparatus of claim 3 comprising in addition means for comparing the amplitude of the spectrum detected by said detector at selected wavelengths of the spectrum.

* * * * *